United States Patent
Kim

(10) Patent No.: US 12,332,644 B2
(45) Date of Patent: Jun. 17, 2025

(54) REMOTE AUTONOMOUS DRIVING CONTROL MANAGEMENT APPARATUS, SYSTEM INCLUDING THE SAME, AND METHOD THEREOF

(71) Applicants: Hyundai Motor Company, Seoul (KR); Kia Corporation, Seoul (KR)

(72) Inventor: Dong Hyuk Kim, Hanam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 155 days.

(21) Appl. No.: 17/506,390

(22) Filed: Oct. 20, 2021

(65) Prior Publication Data

US 2022/0357741 A1 Nov. 10, 2022

(30) Foreign Application Priority Data

May 7, 2021 (KR) .................... 10-2021-0059370

(51) Int. Cl.
*G05D 1/00* (2024.01)
*B60W 30/06* (2006.01)
*B60W 60/00* (2020.01)

(52) U.S. Cl.
CPC ........... *G05D 1/0038* (2013.01); *B60W 30/06* (2013.01); *B60W 60/001* (2020.02); *B60W 2520/22* (2013.01)

(58) Field of Classification Search
CPC .. G05D 1/0038; B60W 30/06; B60W 60/001; B60W 2520/22
USPC ............................................ 701/2
See application file for complete search history.

(56) References Cited

U.S. PATENT DOCUMENTS

| | | | | |
|---|---|---|---|---|
| 9,253,455 | B1* | 2/2016 | Harrison | H04M 11/025 |
| 9,640,002 | B1* | 5/2017 | Grosberg | G07C 9/00174 |
| 10,720,001 | B1* | 7/2020 | Grosberg | G07C 9/27 |
| 11,283,877 | B2* | 3/2022 | Kentley-Klay | G06F 3/0482 |
| 11,520,328 | B2* | 12/2022 | Yamaguchi | G05D 1/0212 |
| 11,632,360 | B1* | 4/2023 | Tan | G06F 3/0622 726/4 |
| 2016/0226713 | A1* | 8/2016 | Dellinger | H04W 4/80 |
| 2017/0048495 | A1* | 2/2017 | Scalisi | H04L 12/2803 |
| 2017/0064551 | A1* | 3/2017 | Block | G06Q 20/341 |
| 2017/0329346 | A1* | 11/2017 | Latotzki | G08G 1/164 |
| 2018/0203470 | A1* | 7/2018 | Pattison | G08G 5/0069 |
| 2018/0370365 | A1* | 12/2018 | Lee | G06F 3/0227 |
| 2019/0334782 | A1* | 10/2019 | Dellinger | H04W 12/06 |
| 2020/0192394 | A1* | 6/2020 | Hammond | G05D 1/0214 |
| 2020/0198620 | A1* | 6/2020 | Nakata | B60W 60/0053 |

(Continued)

*Primary Examiner* — Hunter B Lonsberry
*Assistant Examiner* — Robert L Pinkerton
(74) *Attorney, Agent, or Firm* — Morgan, Lewis & Bockius LLP

(57) ABSTRACT

A remote autonomous driving control management apparatus, a system including the same, and a method thereof are provided. The remote autonomous driving control management apparatus is configured to authenticate a remote control terminal, obtains a surrounding image from an autonomous vehicle, receives a parking position from the remote control terminal, and performs autonomous parking or autonomous stop by remote control, based on the parking position and the surrounding image. The remote autonomous driving control management apparatus shares an accurate position through communication to facilitate precise remote control of the autonomous vehicle.

18 Claims, 10 Drawing Sheets

(56) References Cited

U.S. PATENT DOCUMENTS

| | | | |
|---|---|---|---|
| 2020/0326701 A1* | 10/2020 | Takechi | H04W 4/029 |
| 2020/0358908 A1* | 11/2020 | Scalisi | G08B 13/19667 |
| 2020/0364653 A1* | 11/2020 | Rongley | H04L 9/3213 |
| 2021/0064053 A1* | 3/2021 | Kim | G07C 5/085 |
| 2021/0089972 A1* | 3/2021 | Gaines | G06Q 10/02 |
| 2021/0157335 A1* | 5/2021 | Shimamoto | G06V 20/56 |
| 2021/0194718 A1* | 6/2021 | Scalisi | H04N 7/186 |
| 2021/0216067 A1* | 7/2021 | Noguchi | G06F 3/04186 |
| 2021/0216202 A1* | 7/2021 | Noguchi | B60K 35/29 |
| 2021/0302978 A1* | 9/2021 | Noguchi | G07B 15/04 |
| 2021/0354722 A1* | 11/2021 | Kim | G01C 21/3492 |
| 2022/0019218 A1* | 1/2022 | Tamori | B60W 30/06 |
| 2022/0161853 A1* | 5/2022 | Ramirez Llanos | G06V 20/586 |
| 2022/0242447 A1* | 8/2022 | Nagura | B60W 50/0098 |
| 2023/0032129 A1* | 2/2023 | Hidaka | G07C 5/0808 |
| 2023/0130814 A1* | 4/2023 | Nister | G06N 3/045 |
| | | | 701/23 |
| 2023/0142675 A1* | 5/2023 | Cui | H04L 5/0053 |
| | | | 370/328 |

* cited by examiner

REMOTE AUTONOMOUS DRIVING CONTROL MANAGEMENT APPARATUS, SYSTEM INCLUDING THE SAME, AND METHOD THEREOF

CROSS-REFERENCE TO RELATED APPLICATION

The present application claims priority to Korean Patent Application No. 10-2021-0059370, filed on May 7, 2021, the entire contents of which is incorporated herein for all purposes by this reference.

BACKGROUND OF THE INVENTION

Field of the Invention

The present invention relates to a remote autonomous driving control management apparatus, a system including the same, and a method thereof, and more particularly, relates to a remote autonomous driving control management apparatus considering loading and unloading or riding and alighting, a system including the same, and a method thereof.

Description of Related Art

An autonomous vehicle needs a capability of adaptively coping with a surrounding situation which changes in real time while driving. First of all, a reliable determination control function is required to mass produce and activate autonomous vehicles. An autonomous vehicle recently on the market basically performs driving, braking, and steering rather than a driver to reduce fatigue of the driver. Recently, the autonomous vehicle is loaded with a highway driving assist (HDA) function, a driver status warning (DSW) function of determining driver carelessness, such as drowsy driving or gaze departure, and state abnormality and outputting a warning alarm through a cluster or the like, a driver awareness warning (DAW) function of determining whether the vehicle crosses the line and perform unstable driving by a front view camera, a forward collision-avoidance assist (FCA) or active emergency brake system (AEBS) function of performing emergency braking when detecting a head on collision, or the like to be sold.

When the autonomous vehicle is parked or stopped and when cargoes are loaded or unloaded from the vehicle or a person rides or alights from the vehicle, there is a need to perform parking or stop in a suitable position, with regard to it. Thus, a demand for a technology capable of performing accurate autonomous parking or stop based on precise remote control is emerging.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a remote autonomous driving control management apparatus considering loading and unloading or riding and alighting, a system including the same, and a method thereof.

Various aspects of the present invention provide a remote autonomous driving control management apparatus of sharing an accurate position through communication to facilitate precise remote control, a system including the same, and a method thereof.

Various aspects of the present invention provide a remote autonomous driving control management apparatus configured to perform remote control to facilitate rapid response to changes in logistics environment, a system including the same, and a method thereof.

Various aspects of the present invention provide a remote autonomous driving control management apparatus of increasing convenience of a user who loads or unloads cargoes or rides or alights from the vehicle, with regard to loading and unloading or riding and alighting, a system including the same, and a method thereof.

Various aspects of the present invention provide a remote autonomous driving control management apparatus of providing various methods where a logistics person is able to be connected to a remote person such that the logistics person is able to improve business efficiency of the remote person depending on activation of communication, a system including the same, and a method thereof.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, a remote autonomous driving control management apparatus may include a communication device that communicates with an autonomous vehicle and a remote control terminal and a controller that authenticates the remote control terminal, transmits a surrounding image around the autonomous vehicle, the surrounding image being received from the autonomous vehicle, to the remote control terminal, via the communication device, receives a parking position selected according to the surrounding image from the remote control terminal, via the communication device, and communicates with the autonomous vehicle via the communication device, based on the parking position and the surrounding image, and performs autonomous parking or autonomous stop of the autonomous vehicle by remote control thereof.

In various exemplary embodiments of the present invention, the controller may transmit a remote control link to the remote control terminal via the communication device, when a time remaining until the autonomous vehicle arrives at a destination thereof is a predetermined time period, when approval for the remote control terminal is completed in advance.

In various exemplary embodiments of the present invention, the controller may authenticate the remote control terminal based on an authentication means provided in the autonomous vehicle, when an input through an input device of the autonomous vehicle is received until a predetermined threshold time after the autonomous vehicle arrives at a destination thereof.

In various exemplary embodiments of the present invention, the controller may display an available parking region on the surrounding image by the remote control terminal, based on a size of the autonomous vehicle and may receive a selection of the parking position based on the available parking region, via the remote control terminal.

In various exemplary embodiments of the present invention, the controller may receive at least one of information related to front parking or rear parking selected according to the surrounding image or information related to a selected trailer position from the remote control terminal, via the communication device and may perform the autonomous parking or the autonomous stop by the remote control, based on the at least one of the information related to the selected front parking or rear parking or the information related to the selected trailer position.

In various exemplary embodiments of the present invention, the controller may display real-time motion of the autonomous vehicle by the remote control terminal, may receive an adjusted parking position via the remote control terminal, and may perform the autonomous parking or the autonomous stop by the remote control, based on the adjusted parking position.

According to various aspects of the present invention, a remote autonomous driving control management system may include an autonomous vehicle that transmits a surrounding image to a remote autonomous driving control management apparatus, the remote autonomous driving control management apparatus that authenticates a remote control terminal, transmits the surrounding image received from the autonomous vehicle, to the remote control terminal, and communicates with the autonomous vehicle, based on a parking position input via the remote control terminal and the surrounding image, and performs autonomous parking or autonomous stop by remote control, and the remote control terminal that receives the parking position selected according to the surrounding image and transmits the received parking position to the remote autonomous driving control management apparatus.

In various exemplary embodiments of the present invention, the remote autonomous driving control management apparatus may transmit a remote control link to the remote control terminal, when a time remaining until the autonomous vehicle arrives at a destination thereof is a predetermined time period, when approval for the remote control terminal is completed in advance.

In various exemplary embodiments of the present invention, the autonomous vehicle may provide an authentication means provided in the autonomous vehicle, when an input through an input device of the autonomous vehicle is received until a predetermined threshold time after the autonomous vehicle arrives at a destination thereof.

In various exemplary embodiments of the present invention, the remote autonomous driving control management apparatus may authenticate the remote control terminal based on the authentication means provided in the autonomous vehicle, when the input through the input device of the autonomous vehicle is received until the predetermined threshold time after the autonomous vehicle arrives at the destination.

In various exemplary embodiments of the present invention, the remote control terminal may display an available parking region on the surrounding image based on a size of the autonomous vehicle, may receive a selection of the parking position based on the available parking region, and may transmit information related to the selected parking position to the remote autonomous driving control management apparatus.

In various exemplary embodiments of the present invention, the remote control terminal may receive at least one of information related to front parking or rear parking selected according to the surrounding image or information related to a selected trailer position and may transmit the at least one of the information related to the front parking or the rear parking selected according to the surrounding image or the information related to the selected trailer position to the remote autonomous driving control management apparatus. The remote autonomous driving control management apparatus may perform the autonomous parking or the autonomous stop by the remote control, based on the at least one of the information related to the front parking or the rear parking selected according to the surrounding image or the information related to the selected trailer position.

In various exemplary embodiments of the present invention, the remote control terminal may display real-time motion of the autonomous vehicle, may receive an adjusted parking position, and may transmit information related to the adjusted parking position to the remote autonomous driving control management apparatus. The remote autonomous driving control management apparatus may perform the autonomous parking or the autonomous stop by the remote control, based on the adjusted parking position.

According to various aspects of the present invention, a remote autonomous driving control management method may include transmitting, by an autonomous vehicle, a surrounding image to a remote autonomous driving control management apparatus, authenticating, by the remote autonomous driving control management apparatus, a remote control terminal, transmitting, by the remote autonomous driving control management apparatus, the surrounding image received from the autonomous vehicle, to the remote control terminal, receiving, by the remote control terminal, a parking position selected according to the surrounding image and transmitting, by the remote control terminal, the received parking position to the remote autonomous driving control management apparatus, and communicating, by the remote autonomous driving control management apparatus, with the autonomous vehicle, based on the parking position and the surrounding image, and performing, by the remote autonomous driving control management apparatus, autonomous parking or autonomous stop of the autonomous vehicle by remote control thereof.

In various exemplary embodiments of the present invention, the authenticating of the remote control terminal by the remote autonomous driving control management apparatus may include transmitting, by the remote autonomous driving control management apparatus, a remote control link to the remote control terminal, when a time remaining until the autonomous vehicle arrives at a destination thereof is a predetermined time period, when approval for the remote control terminal is completed in advance.

In various exemplary embodiments of the present invention, the remote autonomous driving control management method may further include providing, by the autonomous vehicle, an authentication means provided in the autonomous vehicle, when an input through an input device of the autonomous vehicle is received until a predetermined threshold time after the autonomous vehicle arrives at a destination thereof.

In various exemplary embodiments of the present invention, the authenticating of the remote control terminal by the remote autonomous driving control management apparatus may further include authenticating, by the remote autonomous driving control management apparatus, the remote control terminal based on the authentication means provided in the autonomous vehicle, when the input through the input device of the autonomous vehicle is received until the predetermined threshold time after the autonomous vehicle arrives at the destination.

In various exemplary embodiments of the present invention, the receiving of the parking position selected according to the surrounding image by the remote control terminal and the transmitting of the received parking position to the remote autonomous driving control management apparatus by the remote control terminal may include displaying, by the remote control terminal, an available parking region on the surrounding image based on a size of the autonomous vehicle, receiving, by the remote control terminal, a selection of the parking position based on the available parking region, and transmitting, by the remote control terminal, information related to the selected parking position to the remote autonomous driving control management apparatus.

In various exemplary embodiments of the present invention, the remote autonomous driving control management method may further include receiving, by the remote control terminal, at least one of information related to front parking or rear parking selected according to the surrounding image or information related to a selected trailer position and transmitting, by the remote control terminal, the at least one of the information related to the front parking or the rear parking selected according to the surrounding image or the information related to the selected trailer position to the remote autonomous driving control management apparatus. The communicating with the autonomous vehicle and the performing of the autonomous parking or the autonomous stop by the remote control by the remote autonomous driving control management apparatus may include performing, by the remote autonomous driving control management apparatus, the autonomous parking or the autonomous stop by the remote control, based on the at least one of the information related to the front parking or the rear parking selected according to the surrounding image or the information related to the selected trailer position.

In various exemplary embodiments of the present invention, the remote autonomous driving control management method may further include displaying, by the remote control terminal, a real-time motion of the autonomous vehicle; receiving, by the remote control terminal, an adjusted parking position and transmitting, by the remote control terminal, information related to the adjusted parking position to the remote autonomous driving control management apparatus. The communicating with the autonomous vehicle and the performing of the autonomous parking or the autonomous stop by the remote control by the remote autonomous driving control management apparatus may include performing, by the remote autonomous driving control management apparatus, the autonomous parking or the autonomous stop by the remote control based on the adjusted parking position.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
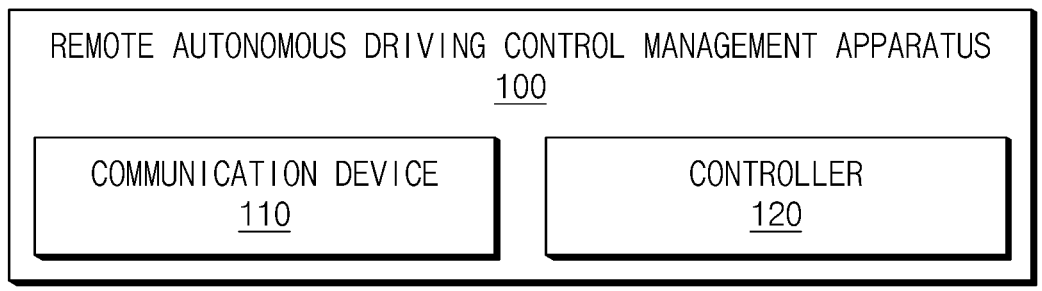
FIG. 1 is a block diagram illustrating a remote autonomous driving control management apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 10.

FIG. 1 is a block diagram illustrating a remote autonomous driving control management apparatus according to various exemplary embodiments of the present invention.

Referring to FIG. 1, the remote autonomous driving control management apparatus 100 may include a communication device 110 and a controller 120.

As an example, the remote autonomous driving control management apparatus 100 may be included in a server which manages remote autonomous driving control to perform the function.

The communication device 110 may communicate with an autonomous vehicle and a remote control terminal.

As an example, the communication device 110 may include communication circuitry which communicates with the autonomous vehicle and the remote control terminal.

As an example, the communication device 110 may be configured to communicate with an external device, may be electrically connected to the controller 120 to deliver received information to the controller 120, may receive information to be transmitted to the external device from the controller 120, and may be controlled by the controller 120.

As an example, the communication device 110 may transmit and receive data using various communication schemes. For example, the communication device 110 may use a wireless-fidelity (Wi-Fi) scheme, a Bluetooth scheme, a ZigBee scheme, an ultra-wide band (UWB) scheme, or a near field communication (NFC) scheme.

The controller 120 may authenticate the remote control terminal.

As an example, the controller 120 may authenticate the remote control terminal based on at least one of approval for the remote control terminal, which is input from a manager, or an input to an input device of the autonomous vehicle.

As an example, the input device of the autonomous vehicle may include an external button of the autonomous vehicle.

As an example, the controller 120 may authenticate the remote control terminal based on whether information related to approval of the remote control terminal, which is input in advance from the manager, is stored in a memory of the remote autonomous driving control management apparatus 100.

The controller 120 may transmit a surrounding image around the autonomous vehicle, which is received from the autonomous vehicle, to the remote control terminal via the communication device 110.

As an example, the controller 120 may receive the surrounding image obtained by a camera provided in the autonomous vehicle from the autonomous vehicle, via the communication device 110, and may transmit the received surrounding image around the autonomous vehicle to the remote control terminal via the communication device 110.

The controller 120 may receive a parking position selected based on the surrounding image from the remote control terminal, via the communication device 110.

As an example, the controller 120 may transmit a command to display the surrounding image around the autonomous vehicle to the remote control terminal such that a logistics person or the like who utilizes the remote control terminal may select a parking position on the surrounding image displayed on the remote control terminal.

As an example, the remote autonomous driving control management apparatus 100 may receive information related to the selected parking position from the remote control terminal, via the communication device 110.

The controller 120 may communicate with the autonomous vehicle via the communication device 110, based on the parking position and the surrounding image, and may perform autonomous parking or autonomous stop of the autonomous vehicle by remote control thereof.

As an example, the controller 120 may perform autonomous driving of the autonomous vehicle by remote control such that the autonomous vehicle is parked or stopped in the parking position selected on the remote control terminal.

The remote control of the autonomous vehicle may be performed by a remote control parking or stop algorithm previously stored in a control center including the remote autonomous driving control management apparatus 100.

As an example, when the approval for the remote control terminal is completed in advance, the controller 120 may transmit a remote control link to the remote control terminal via the communication device 110, when a time remaining until the autonomous vehicle arrives at a destination thereof is a predetermined specific time.

When the controller 120 transmits the remote control link to the remote control terminal, the logistics person or the like who utilizes the remote control terminal may access the remote autonomous driving control management apparatus 100 by the remote control link.

When the remote control terminal is connected to the remote autonomous driving control management apparatus 100, the autonomous vehicle may enter the remote control mode to be controlled by remote control thereof.

As an example, when an input through an input device of the autonomous vehicle is received until a predetermined threshold time after the autonomous vehicle arrives at the destination, the controller 120 may authenticate the remote control terminal based on an authentication means provided in the autonomous vehicle.

As an example, when the input through the input device of the autonomous vehicle is received until the predetermined threshold time after the autonomous vehicle arrives at the destination, the controller 120 may authenticate the remote control terminal, based on a voice call with a manager through an external speaker of the autonomous vehicle, a number of the remote control terminal, which is input to a keypad of the autonomous vehicle, a connection with the manager through a vehicle internal system, which is provided after the door of the autonomous vehicle is opened, or a quick response (QR) code displayed on the autonomous vehicle.

As an example, when the input through the input device of the autonomous vehicle is received until the predetermined threshold time after the autonomous vehicle arrives at the destination, the controller 120 may provide a voice call with the manager through the external speaker of the autonomous vehicle.

In the instant case, the logistics person or the like which presses the external button of the autonomous vehicle may be identified by the voice call with the manager and may receive the authentication of the remote control terminal.

At the present time, when the authentication of the remote control terminal is completed by a voice call provided by a logistics person or the like who inputs a signal through the input device of the autonomous vehicle, the controller 120 may transmit a remote control link to the remote control terminal via the communication device 110.

As various exemplary embodiments of the present invention, when an input is received through the input device of the autonomous vehicle until the predetermined threshold time after the autonomous vehicle arrives at the destination, the controller 120 may provide a keypad, provided in the autonomous vehicle, configured for inputting a number of the remote control terminal.

In the instant case, the logistics person or the like who inputs a signal through the input device of the autonomous vehicle may input a number of the remote control terminal to the provided keypad and may receive a remote control link via the remote control terminal.

At the present time, as the logistics person or the like who inputs the signal through the input device of the autonomous vehicle inputs a number of the remote control terminal to the provided keypad, when the authentication of the remote control terminal is completed, the controller 120 may transmit a remote control link to the remote control terminal via the communication device 110.

As various exemplary embodiments of the present invention, when the input through the input device of the autonomous vehicle is received until the predetermined threshold time after the autonomous vehicle arrives at the destination, the controller 120 may control the autonomous vehicle such that the door of the autonomous vehicle is opened and may provide a connection with the manager through an internal system of the autonomous vehicle, when the door of the autonomous vehicle is opened.

In the instant case, the connection with the manager through the internal system of the autonomous vehicle may be performed in various forms such as in a form of a voice call, a video call, and a messenger through an audio, video, navigation (AVN) or the like. The logistics person or the like who inputs a signal by the input device of the autonomous vehicle may be identified through the connection with the manager in the vehicle and may receive the authentication of the remote control terminal.

At the present time, when the authentication of the remote control terminal is completed by the connection with the manager using the internal system of the autonomous vehicle, which is provided by the logistics person or the like who inputs a signal through the input device of the autonomous vehicle, the controller 120 may transmit a remote control link to the remote control terminal via the communication device 110.

As various exemplary embodiments of the present invention, when the input through the input device of the autonomous vehicle is received until the predetermined threshold time after the autonomous vehicle arrives at the destination, the controller 120 may display a QR code on the autonomous vehicle.

In the instant case, the logistics person or the like who inputs the signal through the input device of the autonomous vehicle may receive the authentication of the remote control terminal by the QR code provided using the remote control terminal.

At the present time, when the authentication of the remote control terminal connected by the provided QR code by the logistics person or the like who inputs the signal through the input device of the autonomous vehicle, the controller 120 may control such that the remote control terminal may access the remote control link.

As an example, the controller 120 may display an available parking region on the surrounding image by the remote control terminal, based on a size of the autonomous vehicle.

As an example, the controller 120 may communicate with the remote control terminal via the communication device 110, may display a surrounding image around the autonomous vehicle on the remote control terminal, may determine an available parking region with regard to a parking area according to a size of the autonomous vehicle on the displayed surrounding image, and may display the determined available parking region on the remote control terminal.

As an example, the controller 120 may receive a selection of the parking position, based on the available parking region via the remote control terminal.

As an example, when the logistics person or the like selects the parking position by a touch, a button input, or the like in the displayed available parking region, the remote control terminal may transmit information related to the selected parking position to the remote autonomous driving control management apparatus 100. The controller 120 may receive the information related to the selected parking position via the communication device 110.

As an example, the controller 120 may receive at least one of information related to front parking or rear parking selected based on the surrounding image or information related to a selected trailer position, via the communication device 110.

As an example, when the logistics person or the like inputs at least one of a selection of front parking or rear parking or a selection of a position of a trailer by a touch, a button input, or the like on the displayed surrounding image around the autonomous vehicle, the remote control terminal may transmit information related to the at least input one of the selection of the front parking or the rear parking or the selection of the position of the trailer to the remote autonomous driving control management apparatus 100. The controller 120 may receive the information related to the at least one of the selection of the front parking or the rear parking or the selection of the position of the trailer, via the communication device 110.

As an example, the controller 120 may perform autonomous parking or autonomous stop by remote control, based on at least one of information related to the selected front parking or rear parking or information related to the selected trailer position.

As an example, the controller 120 may perform front parking or rear parking of the autonomous vehicle by remote control depending on the selected front parking or rear parking and may perform autonomous parking or autonomous stop of the autonomous vehicle at a position determined that it is suitable for cargoes loaded on the autonomous vehicle to be loaded and unloaded, depending on the selected trailer position.

As an example, the controller 120 may display real-time motion of the autonomous vehicle on the remote control terminal.

As an example, the controller 120 may receive information related to real-time motion of the autonomous vehicle from the autonomous vehicle via the communication device 110 and may transmit the information related to the real-time motion of the autonomous vehicle to the remote control terminal.

As an example, the controller 120 may receive the adjusted parking position via the remote control terminal.

As an example, the remote control terminal may display the received real-time motion of the autonomous vehicle, may receive the parking position adjusted on the surrounding image from the logistics person or the like, and may transmit information related to the received adjusted parking position to the remote autonomous driving control management apparatus 100.

As an example, the controller 120 may perform autonomous parking or autonomous stop by remote control based on the adjusted parking position.

As an example, the controller 120 may perform autonomous parking or autonomous stop by remote control such that the autonomous vehicle is parked or stopped in the adjusted parking position received via the communication device 110.

Figure 2:
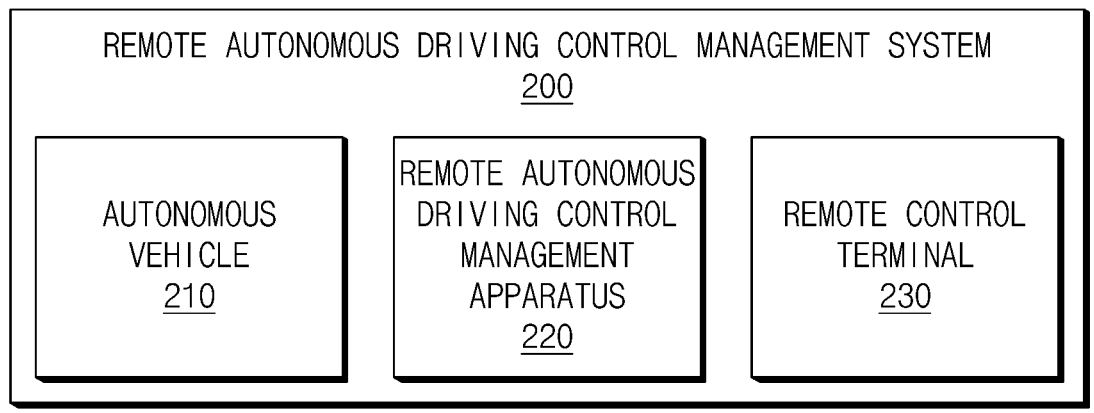
FIG. 2 is a block diagram illustrating a remote autonomous driving control management system according to various exemplary embodiments of the present invention.

FIG. 2 is a block diagram illustrating a remote autonomous driving control management system according to various exemplary embodiments of the present invention.

Referring to FIG. 2, a remote autonomous driving control management system 200 may include an autonomous vehicle 210, a remote autonomous driving control management apparatus 220, and a remote control terminal 230.

The autonomous vehicle 210 may include a light detection and ranging (LIDAR), a blind-spot view monitor, a radar, a driver state detection module, a global positioning system (GPS), a communication module, and the like.

The autonomous vehicle 210 may transmit an input to its input device and a surrounding image to the remote autonomous driving control management apparatus 220.

As an example, the autonomous vehicle 210 may receive a signal from a logistics person or the like via the input device of the autonomous vehicle 210 and may obtain a surrounding image around the autonomous vehicle 210, by a camera provided in the autonomous vehicle 210.

As an example, the autonomous vehicle 210 may transmit an input to the input device and the surrounding image to the remote autonomous driving control management apparatus 220, via a communication module provided in the autonomous vehicle 210.

As an example, the autonomous vehicle 210 may include a vehicle to everything (V2X) communication module.

As an example, when an input through the input device of the autonomous vehicle 210 is received until a predetermined threshold time after the autonomous vehicle 210 arrives at a destination, the autonomous vehicle 210 may provide an authentication means provided in the autonomous vehicle 210.

As an example, when the input through the input device of the autonomous vehicle 210 is received until the predetermined threshold time after the autonomous vehicle 210 arrives at the destination, the autonomous vehicle 210 may provide a voice call with a manager through an external speaker of the autonomous vehicle 210, a keypad of the autonomous vehicle 210, which receives a number of the remote control terminal 230, a connection with the manager through a vehicle interior system, which is provided after the door of the autonomous vehicle 210 is opened, or a QR code displayed on the autonomous vehicle 210.

As an example, the autonomous vehicle 210 may have at least one of a speaker, a microphone, a display, a keypad, or a touch screen on its outside.

As an example, the autonomous vehicle 210 may provide a voice call with the manager through the external speaker of the autonomous vehicle 210, the keypad of the autonomous vehicle 210, which receives a number of the remote control terminal 230, or a QR code displayed on the autonomous vehicle 210, by at least one of the speaker, the microphone, the display, the keypad, or the touch screen provided on the outside.

When the input through the input device of the autonomous vehicle 210 is not received until the predetermined threshold time after the autonomous vehicle 210 arrives at the destination, the autonomous vehicle 210 may actively receive a remote control mode entry command via the remote autonomous driving control management apparatus 220 from the manager and may enter the remote control mode.

The remote autonomous driving control management apparatus 220 may authenticate the remote control terminal 230 based on at least one of approval for the remote control terminal 230, which is input from the manager, or an input to an external button of the autonomous vehicle 210.

As an example, when the approval for the remote control terminal 230 is completed in advance, the remote autonomous driving control management apparatus 220 may transmit a remote control link to the remote control terminal 230, when a time remaining until the autonomous vehicle 210 arrives at the destination is a predetermined specific time.

As an example, the remote autonomous driving control management apparatus 220 may receive information related to the time remaining until the autonomous vehicle 210 arrives at the destination from the autonomous vehicle 210.

As an example, when the input through the input device of the autonomous vehicle 210 is received until the predetermined threshold time after the autonomous vehicle 210 arrives at the destination, the remote autonomous driving control management apparatus 220 may authenticate the remote control terminal 230 based on an authentication means provided in the autonomous vehicle 210.

When the input through the input device of the autonomous vehicle 210 is received until the predetermined threshold time after the autonomous vehicle 210 arrives at the destination, the remote autonomous driving control management apparatus 220 may authenticate the remote control terminal 230, based on a voice call with the manager through the external speaker of the autonomous vehicle 210, a number of the remote control terminal 230, which is input to the keypad of the autonomous vehicle 210, a connection with the manager through the vehicle internal system, which is provided after the door of the autonomous vehicle 210 is opened, or a QR code displayed on the autonomous vehicle 210.

As an example, when the input through the input device of the autonomous vehicle 210 is received until the predetermined threshold time after the autonomous vehicle 210 arrives at the destination, the remote autonomous driving control management apparatus 220 may transmit a remote control access link to the remote control terminal 230, when the authentication of the remote control terminal 230 is completed by a voice call with the manager through the external speaker of the autonomous vehicle 210.

As an example, when the input through the input device of the autonomous vehicle 210 is received until the predetermined threshold time after the autonomous vehicle 210 arrives at the destination, the remote autonomous driving control management apparatus 220 may transmit a remote control access link to the remote control terminal 230, when the authentication of the remote control terminal 230 is completed by a number of the remote control terminal 230, which is input to the keypad of the autonomous vehicle 210.

As an example, when the input through the input device of the autonomous vehicle 210 is received until the predetermined threshold time after the autonomous vehicle 210 arrives at the destination, the remote autonomous driving control management apparatus 220 may transmit a remote control access link to the remote control terminal 230 or may provide remote control access of a logistics person or the like by the vehicle internal system, when the authentication of the remote control terminal 230 is completed by a connection with the manager through the vehicle internal system, which is provided after the door of the autonomous vehicle 210 is opened.

As an example, when the input through the input device of the autonomous vehicle 210 is received until the predetermined threshold time after the autonomous vehicle 210 arrives at the destination, the remote autonomous driving control management apparatus 220 may be connected to the remote control terminal 230 through a remote control access link of the QR code, when the remote control terminal 230 accesses a link of the QR code displayed on the autonomous vehicle 210 and the authentication of the remote control terminal 230 is completed.

As an example, when the input through the input device of the autonomous vehicle 210 is received until the predetermined threshold time after the autonomous vehicle 210 arrives at the destination, the remote autonomous driving control management apparatus 220 may receive a remote control mode entry command of the autonomous vehicle 210 from the manager and may transmit the received remote control mode entry command to the autonomous vehicle 210.

The remote autonomous driving control management apparatus 220 may transmit a surrounding image around the autonomous vehicle 210, which is received from the autonomous vehicle 210, to the remote control terminal 230.

As an example, the remote autonomous driving control management apparatus 220 may transmit the surrounding image around the autonomous vehicle 210, which is received from the autonomous vehicle 210, to the remote control terminal 230, the authentication of which is completed.

The remote autonomous driving control management apparatus 220 may communicate with the autonomous vehicle 210 based on the parking position and the surrounding image input via the remote control terminal 230 and may perform autonomous parking or autonomous stop of the autonomous vehicle by remote control thereof.

As an example, the remote autonomous driving control management apparatus 220 may perform the autonomous parking or the autonomous stop of the autonomous vehicle 210 by the remote control such that the autonomous vehicle 210 is parked or stopped in a parking position input through the remote control terminal 230.

As an example, the remote autonomous driving control management apparatus 220 may remotely control the autonomous vehicle 210 such that the autonomous vehicle 210 does not collide with a surrounding object, based on the surrounding image around the autonomous vehicle 210.

As an example, the remote autonomous driving control management apparatus 220 may remotely control the autonomous vehicle 210 such that an interval between the autonomous vehicle 210 and a surrounding object is not greater than a predetermined threshold distance, based on the surrounding image around the autonomous vehicle 210.

As an example, the remote autonomous driving control management apparatus 220 may perform the autonomous parking or the autonomous stop by the remote control, based on at least one of information related to front parking or rear parking selected based on the surrounding image or information related to a selected trailer position.

As an example, the remote autonomous driving control management apparatus 220 may perform the front parking or the rear parking of the autonomous vehicle 210 by the remote control, depending on a selection of the front parking or the rear parking, which is input through the remote control terminal 230, or may perform the autonomous parking or the autonomous stop by the remote control of the autonomous vehicle 210 in a position determined that it is suitable for the autonomous vehicle 210 to load and unload cargoes, depending on the trailer position.

As an example, the remote autonomous driving control management apparatus 220 may perform the autonomous parking or the autonomous stop by the remote control based on an adjusted parking position.

As an example, the remote autonomous driving control management apparatus 220 may perform the autonomous parking or the autonomous stop by the remote control of the autonomous vehicle 210 such that the autonomous vehicle 210 is parked or stopped in the adjusted parking position input through the remote control terminal 230.

The remote control terminal 230 may receive a parking position selected based on the surrounding image and may transmit the received parking position to the remote autonomous driving control management apparatus 220.

As an example, the remote control terminal 230 may include at least one of a display, a touch screen, a key button, or a communication module.

As an example, the remote control terminal 230 may display the surrounding image around the autonomous vehicle 210 on the display and may receive a selection of a parking position by at least one of the touch screen or the key button.

As an example, the remote control terminal 230 may transmit information related to the selected parking position to the remote autonomous driving control management apparatus 220, via the communication module.

As an example, the remote control terminal 230 may display an available parking region on the surrounding image based on a size of the autonomous vehicle 210.

As an example, the remote control terminal 230 may display an available parking region determined with regard to a parking area according to a size of the autonomous vehicle 210 on the displayed surrounding image.

As an example, the remote control terminal 230 may receive a selection of the parking position based on the available parking region.

As an example, the remote control terminal 230 may receive a parking position selected from a logistics person or the like in the displayed available parking region.

As an example, the remote control terminal 230 may transmit information related to the selected parking position to the remote autonomous driving control management apparatus 220.

As an example, the remote control terminal 230 may transmit information related to the selected parking position to the remote autonomous driving control management apparatus 220, via the communication module.

As an example, the remote control terminal 230 may receive at least one of information related to the front parking or the rear parking selected based on the surrounding image or information related to the selected trailer position.

As an example, the remote control terminal 230 may receive at least one of a selection of the front parking or the rear parking or a selection of the trailer position, by a touch of the touch screen on the displayed surrounding image or an input of the key button.

As an example, the remote control terminal 230 may transmit at least one of information related to the front parking or the rear parking selected based on the surrounding image or information related to the selected trailer position to the remote autonomous driving control management apparatus 220.

As an example, remote control terminal 230 may transmit at least one of information related to the selected front parking or rear parking or information related to the selected trailer position to the remote autonomous driving control management apparatus 220 via the communication module.

As an example, the remote control terminal 230 may display real-time motion of the autonomous vehicle 210.

As an example, the remote control terminal 230 may display real-time motion of the autonomous vehicle 210, which is received via the remote autonomous driving control management apparatus 220, on the display.

As an example, the remote control terminal 230 may receive the adjusted parking position.

As an example, the remote control terminal 230 may receive the parking position adjusted on the surrounding image from the logistics person or the like.

As an example, the remote control terminal 230 may transmit information related to the adjusted parking position to the remote autonomous driving control management apparatus 220.

As an example, the remote control terminal 230 may transmit information related to the adjusted parking position to the remote autonomous driving control management apparatus 220, via the communication module.

Figure 3:
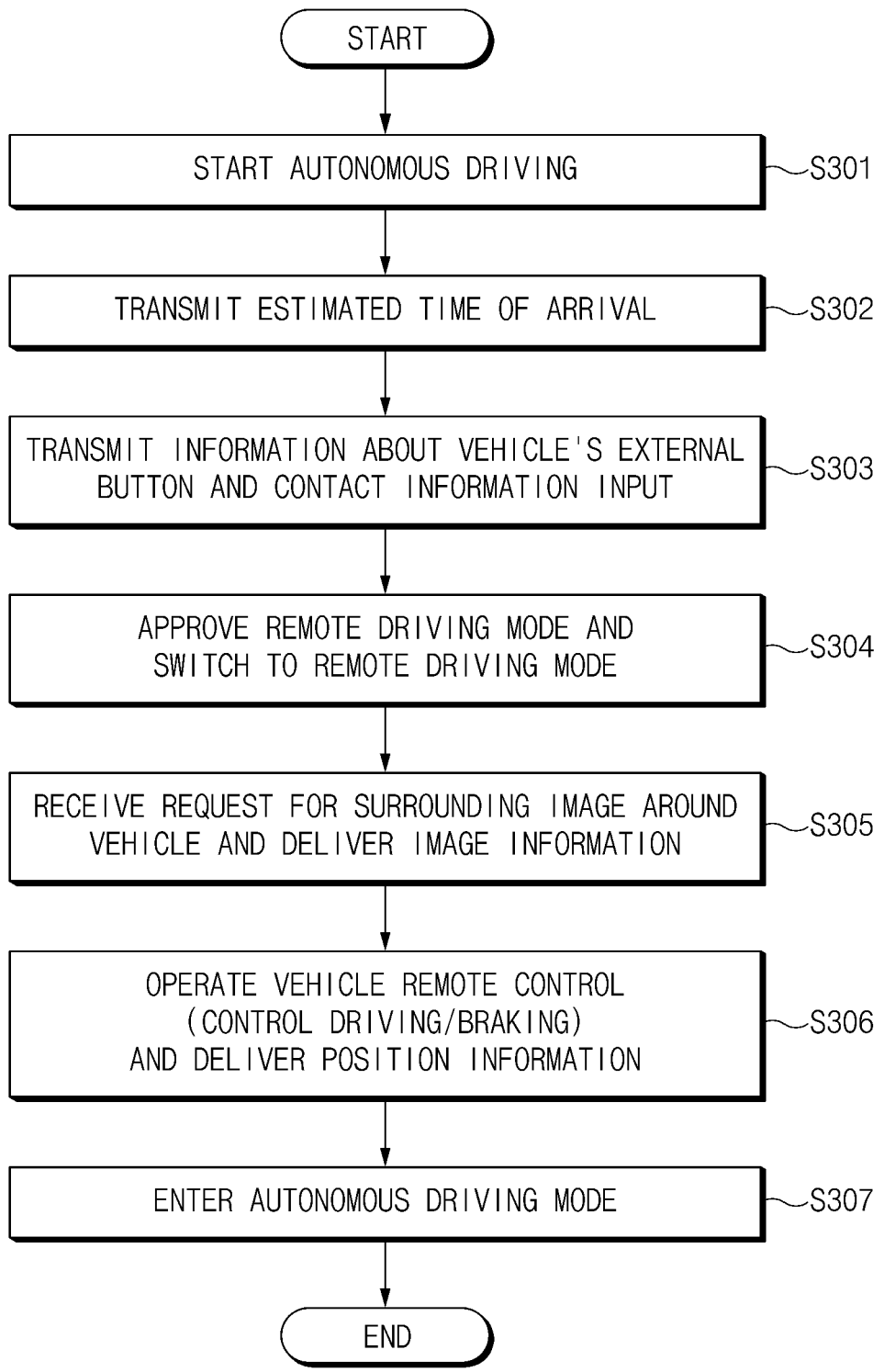
FIG. 3 is a flowchart illustrating a process where an autonomous vehicle operates according to various exemplary embodiments of the present invention.

FIG. 3 is a flowchart illustrating a process where an autonomous vehicle operates according to various exemplary embodiments of the present invention.

Referring to FIG. 3, in S301, an autonomous vehicle 210 of FIG. 2 may start autonomous driving.

As an example, the autonomous vehicle 210 may travel while a person does not ride in the autonomous vehicle 210, by autonomous driving toward a destination.

After starting the autonomous driving in S301, in S302, the autonomous vehicle 210 may transmit an estimated time of arrival to a remote autonomous driving control management apparatus 100 or 220 of FIG. 1 or 2.

As an example, the autonomous vehicle 210 may transmit an estimated time of arrival, determined by a navigation system or the like of the autonomous vehicle 210 based on destination information, position information through a GPS, or the like during autonomous driving, to the remote autonomous driving control management apparatus 100 or 220 via the communication module.

After transmitting the estimated time of arrival to the remote autonomous driving control management apparatus 100 or 220 in S302, in S303, the autonomous vehicle 210 may transmit at least one of information related to a vehicle's external button or information related to a contact information input to the remote autonomous driving control management apparatus 100 or 220.

As an example, the autonomous vehicle 210 may transmit at least one of information indicating whether the external button provided in the autonomous vehicle 210 is pressed or contact information of the remote control terminal 230, which is input by a keypad or the like provided outside or inside the autonomous vehicle 210 to the remote autonomous driving control management apparatus 100 or 220.

After transmitting the at least one of the information related to the vehicle's external button or the information related to the contact information input to the remote autonomous driving control management apparatus 100 or 220 in S303, in S304, the autonomous vehicle 210 may approve a remote driving mode and may switch to the remote driving mode.

As an example, the autonomous vehicle 210 may determine whether it is able to switch to the remote driving mode based on various pieces of detecting information or the like of the autonomous vehicle 210 and may approve the remote driving mode to switch from the autonomous driving mode to the remote driving mode.

Herein, the remote driving mode may refer to a mode which interworks with a control center including the remote autonomous driving control management apparatus 100 or 220 outside the vehicle and receives a control command from the control center to perform autonomous driving, rather than a mode which performs autonomous driving using only an autonomous driving system in the autonomous vehicle 210.

After approving the remote driving mode and switching to the remote driving mode in S304, in S305, the autonomous vehicle 210 may receive a request for an image around the autonomous vehicle 210 from the remote autonomous driving control management apparatus 100 or 220 and deliver image information to the remote autonomous driving control management apparatus 100 or 220.

As an example, the autonomous vehicle 210 may transmit a surrounding image obtained by a camera provided in the autonomous vehicle 210 to the remote autonomous driving control management apparatus 100 or 220 in real time.

After receiving the request for the image around the autonomous vehicle 210 from the remote autonomous driving control management apparatus 100 or 220 and delivering the image information to the remote autonomous driving control management apparatus 100 or 220 in S305, in S306, the autonomous vehicle 210 may operate remote control of the autonomous vehicle 210 and may deliver position information of the autonomous vehicle 210 to the remote autonomous driving control management apparatus 100 or 220.

As an example, the autonomous vehicle 210 may perform driving control or braking control of the autonomous vehicle 210 based on a control command received from the remote autonomous driving control management apparatus 100 or 220, by an autonomous driving system of the autonomous vehicle 210, and may transmit the position information of the autonomous vehicle 210, which is obtained through the GPS, to the remote autonomous driving control management apparatus 100 or 220.

After operating the remote control of the autonomous vehicle 210 and delivering the position information of the autonomous vehicle 210 to the remote autonomous driving control management apparatus 100 or 220 in S306, in S307, the autonomous vehicle 210 may enter an autonomous driving mode.

As an example, when the autonomous parking or the autonomous stop is completed by remote control, the autonomous vehicle 210 may switch the driving mode of the autonomous vehicle 210 from the remote control mode to the autonomous driving mode.

Figure 4:
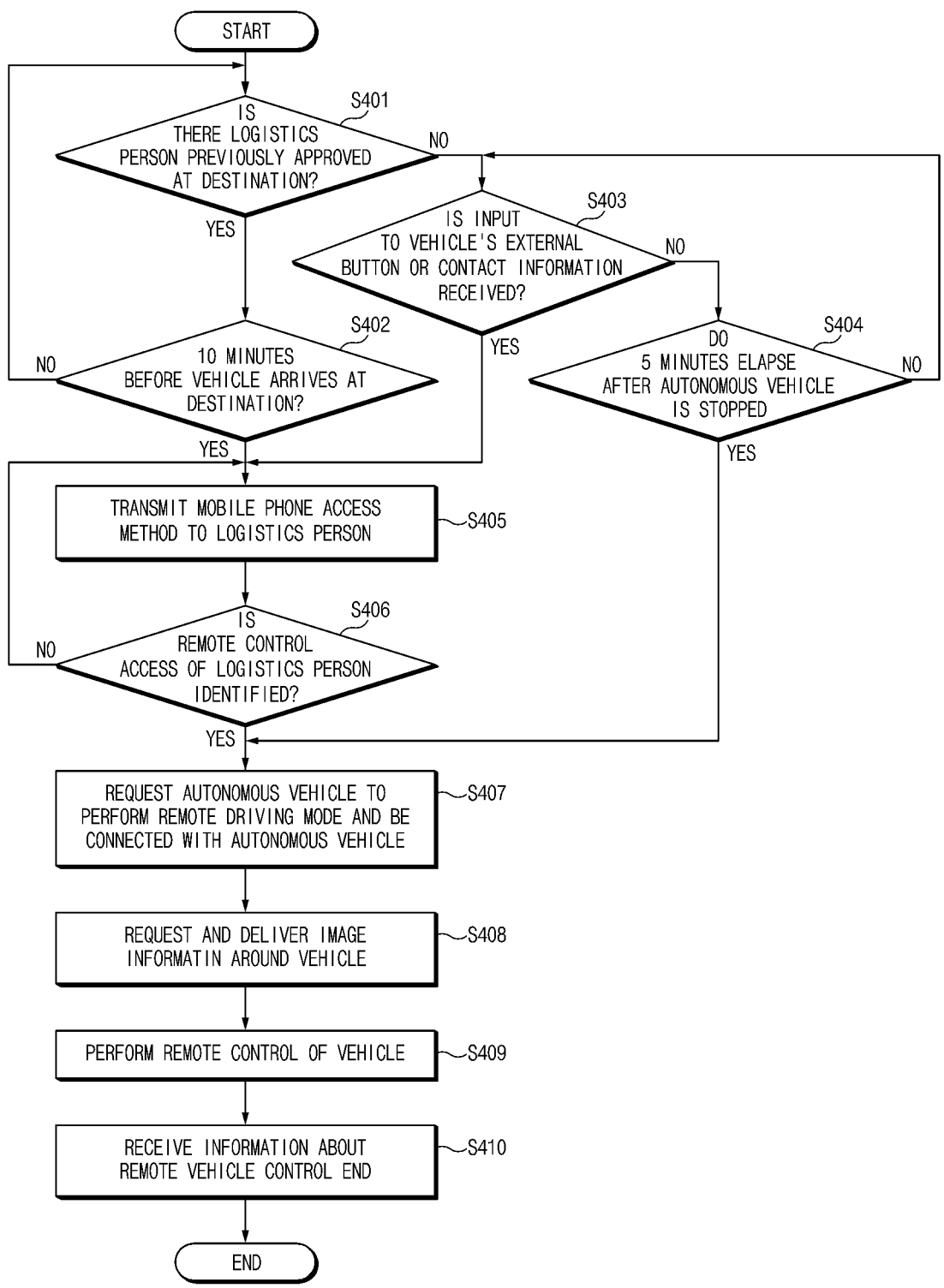
FIG. 4 is a flowchart illustrating a process where a remote autonomous driving control management apparatus operates according to various exemplary embodiments of the present invention.

FIG. 4 is a flowchart illustrating a process where a remote autonomous driving control management apparatus operates according to various exemplary embodiments of the present invention.

Referring to FIG. 4, in S401, a remote autonomous driving control management apparatus 100 or 220 of FIG. 1 or 2 may determine whether there is a logistics person previously approved at a destination thereof.

As an example, the remote autonomous driving control management apparatus 100 or 220 may determine whether there is the logistics person previously approved at the destination, based on whether there is a remote control terminal 230 of the logistics person previously approved from a manager.

After determining whether there is the logistics person previously approved at the destination in S401, when it is determined that there is the logistics person previously approved at the destination, in S402, the remote autonomous driving control management apparatus 100 or 220 may determine whether it is 10 minutes before an autonomous vehicle 210 of FIG. 2 arrives at the destination.

As an example, the remote autonomous driving control management apparatus 100 or 220 may determine whether it is 10 minutes before the autonomous vehicle 210 arrives at the destination, based on a time when the autonomous vehicle 210 arrives at the destination, which is received from the autonomous vehicle 210.

Herein, the time "10 minutes" may be a time randomly set to give an example, which may be actually set to another time.

After determining whether it is 10 minutes before the autonomous vehicle 210 arrives at the destination in S402, when it is determined that it is 10 minutes before the autonomous vehicle 210 arrives at the destination, in S405, the remote autonomous driving control management apparatus 100 or 220 transmit a link for a mobile phone access method to the logistics person.

As an example, the remote autonomous driving control management apparatus 100 or 220 may transmit a remote control access link where the remote control terminal 230 is configured to be connected to the remote autonomous driving control management apparatus 100 or 220 for remote control to the remote control terminal 230.

After determining whether it is 10 minutes before the autonomous vehicle 210 arrives at the destination in S402, when it is determined that it is not 10 minutes before the autonomous vehicle 210 arrives at the destination, the remote autonomous driving control management apparatus 100 or 220 may return to S501 to determine whether there is a logistics person previously approved at the destination.

After determining whether there is the logistics person previously approved at the destination in S401, when it is determined that there is no logistics person previously approved at the destination, in S403, the remote autonomous driving control management apparatus 100 or 220 may determine whether at least one of an input to a vehicle's external button or contact information is received from the autonomous vehicle 210.

In S403, the remote autonomous driving control management apparatus 100 or 220 may determine whether the at least one of the input to the vehicle's external button or the contact information of the remote control terminal 230 is received from the autonomous vehicle 210, via a communication device 110 of FIG. 1.

After determining whether the at least one of the input to the vehicle's external button or the contact information is received from the autonomous vehicle 210 in S403, when it is determined that the at least one of the input to the vehicle's external button or the contact information is received from the autonomous vehicle 210, in S405, the remote autonomous driving control management apparatus 100 or 220 may transmit a link for a mobile phone access method to the logistics person.

As an example, when it is determined that the at least one of the input to the vehicle's external button or the contact information is received, the remote autonomous driving control management apparatus 100 or 220 may transmit a remote control access link connectable for remote control to the remote control terminal 230.

After determining whether the at least one of the input to the vehicle's external button or the contact information is received from the autonomous vehicle 210 in S403, when it is determined that the at least one of the input to the vehicle's external button or the contact information is not received from the autonomous vehicle 210, in S404, the remote autonomous driving control management apparatus 100 or 220 may determine whether 5 minutes elapse after the autonomous vehicle 210 is stopped.

After determining whether 5 minutes elapse after the autonomous vehicle 210 is stopped in S404, when it is determined that 5 minutes elapse after the autonomous vehicle 210 is stopped, in S407, the remote autonomous driving control management apparatus 100 or 220 may request the autonomous vehicle 210 to perform the remote driving mode and may be connected to the autonomous vehicle 210.

Herein, the time "5 minutes" may be a time randomly set to give an example, which may be actually set to another time.

As an example, when it is determined that 5 minutes elapse after the autonomous vehicle 210 is stopped, the remote autonomous driving control management apparatus 100 or 220 may actively receive a remote control mode entry command of the autonomous vehicle 210 from a manager, may control the autonomous vehicle 210 in the remote control mode, and may be connected to the autonomous vehicle 210.

After determining whether 5 minutes elapse after the autonomous vehicle 210 is stopped in S404, when it is determined that 5 minutes does not elapse after the autonomous vehicle 210 is stopped, the remote autonomous driving control management apparatus 100 or 220 may return to S403 to determine whether at least one of an input to the vehicle's external button or contact information is received from the autonomous vehicle 210.

After transmitting the link for the mobile phone access method to the logistics person in S405, in S406, the remote autonomous driving control management apparatus 100 or 220 may identify remote control access of the logistics person.

As an example, the remote autonomous driving control management apparatus 100 or 220 may determine whether the logistics person or the like accesses the remote control access link using the remote control terminal 230.

After identifying the remote control access of the logistics person in S406, when the remote control access of the logistics person is identified, in S407, the remote autonomous driving control management apparatus 100 or 220 may request the autonomous vehicle 210 to perform the remote driving mode and may be connected to the autonomous vehicle 210.

As an example, the remote autonomous driving control management apparatus 100 or 220 may transmit remote driving mode request information to the autonomous vehicle 210. When the autonomous vehicle 210 approves remote control, the remote autonomous driving control management apparatus 100 or 220 may be connected to the autonomous vehicle 210.

After identifying the remote control access of the logistics person in S406, when the remote control access of the logistics person is not identified, the remote autonomous driving control management apparatus 100 or 220 may return to S405 to determine whether at least one of an input to the vehicle's external button or contact information is received from the autonomous vehicle 210.

After requesting the autonomous vehicle 210 to perform the remote driving mode and being connected to the autonomous vehicle 210 in S407, in S408, the remote autonomous driving control management apparatus 100 or 220 may request the autonomous vehicle 210 to transmit image information around the autonomous vehicle 210 and may deliver the image information around the autonomous vehicle 210 to the remote control terminal 230.

As an example, the remote autonomous driving control management apparatus 100 or 220 may transmit the image information around the autonomous vehicle 210, which is received from the autonomous vehicle 210, to the remote control terminal 230.

After requesting the autonomous vehicle 210 to transmit the image information around the autonomous vehicle 210 and delivering the image information around the autonomous vehicle 210 to the remote control terminal 230 in S408, in operation 409, the remote autonomous driving control management apparatus 100 or 220 may perform remote control of the autonomous vehicle 210.

As an example, the remote autonomous driving control management apparatus 100 or 220 may receive information related to a parking position of the autonomous vehicle 210 from the remote control terminal 230 and may perform autonomous parking or autonomous stop by remote control of the autonomous vehicle 210, based on the received information related to the parking position.

After performing the remote control of the autonomous vehicle 210 in S409, in S410, the remote autonomous driving control management apparatus 100 or 220 may receive information related to remote vehicle control end from the autonomous vehicle 210.

As an example, the remote autonomous driving control management apparatus 100 or 220 may transmit the information related to the remote vehicle control end, which is received from the autonomous vehicle 210, to the remote control terminal 230 and may receive an acknowledgement to a parking or stop position of the autonomous vehicle 210 from the remote control terminal 230.

Figure 5:
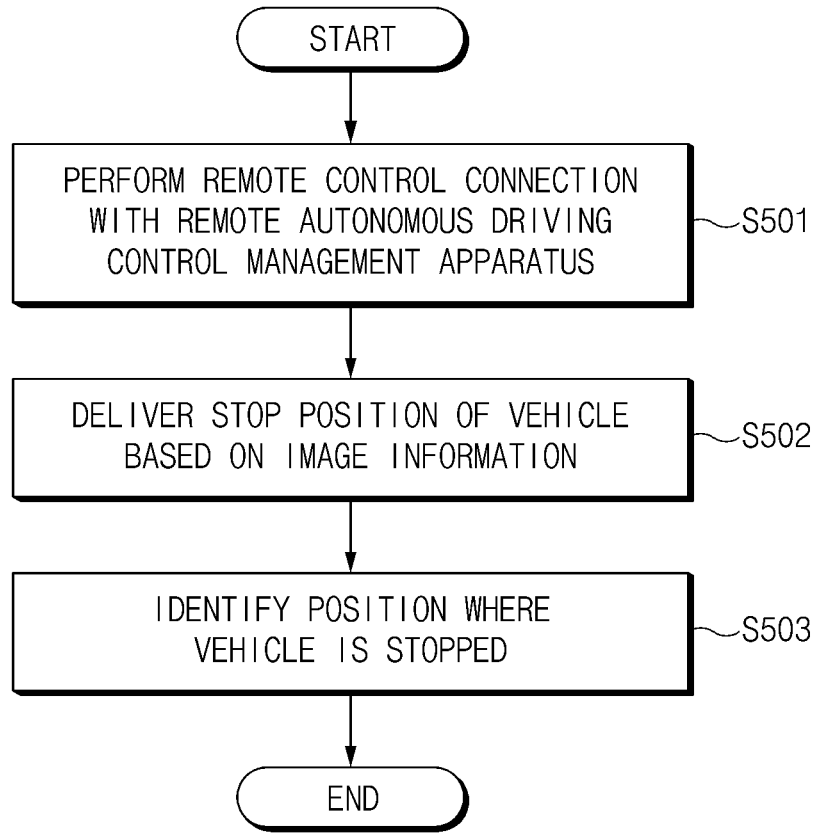
FIG. 5 is a flowchart illustrating a process where a remote control terminal operates according to various exemplary embodiments of the present invention.

FIG. 5 is a flowchart illustrating a process where a remote control terminal operates according to various exemplary embodiments of the present invention.

Referring to FIG. 5, in S501, a remote control terminal 230 of FIG. 2 may perform a remote control connection with a remote autonomous driving control management apparatus 100 or 220 of FIG. 1 or 2.

As an example, the remote control terminal 230 may perform the remote control connection with the remote autonomous driving control management apparatus 100 or 220, through a remote control access link received from the remote autonomous driving control management apparatus 100 or 220.

After performing the remote control connection with the remote autonomous driving control management apparatus 100 or 220 in S501, in S502, the remote control terminal 230 may deliver a stop or parking position of an autonomous vehicle 210 of FIG. 2 to the remote autonomous driving control management apparatus 100 or 220 based on image information.

As an example, the remote control terminal 230 may receive a surrounding image around the autonomous vehicle 210 from the remote autonomous driving control management apparatus 100 or 220, may display the surrounding image on its display, and may receive a stop or parking position of the autonomous vehicle 210 by the displayed surrounding image from a logistics person.

As an example, the remote control terminal 230 may transmit information related to the stop or parking position of the autonomous vehicle 210, which is received from the logistics person, to the remote autonomous driving control management apparatus 100 or 220.

After delivering the stop or parking position of the autonomous vehicle 210 to the remote autonomous driving control management apparatus 100 or 220 in S502, in S503, the remote control terminal 230 may identify the position where the autonomous vehicle 210 is stopped or parked.

As an example, the remote control terminal 230 may receive an acknowledgment to the position where the autonomous vehicle 210 is parked or stopped from the logistics person, by information related to remote vehicle control end and the surrounding image around the autonomous vehicle 210, which are received from the remote autonomous driving control management apparatus 100 or 220, and may transmit the input acknowledgment to the position where the autonomous vehicle 210 is parked or stopped to the remote autonomous driving control management apparatus 100 or 220.

Figure 6:
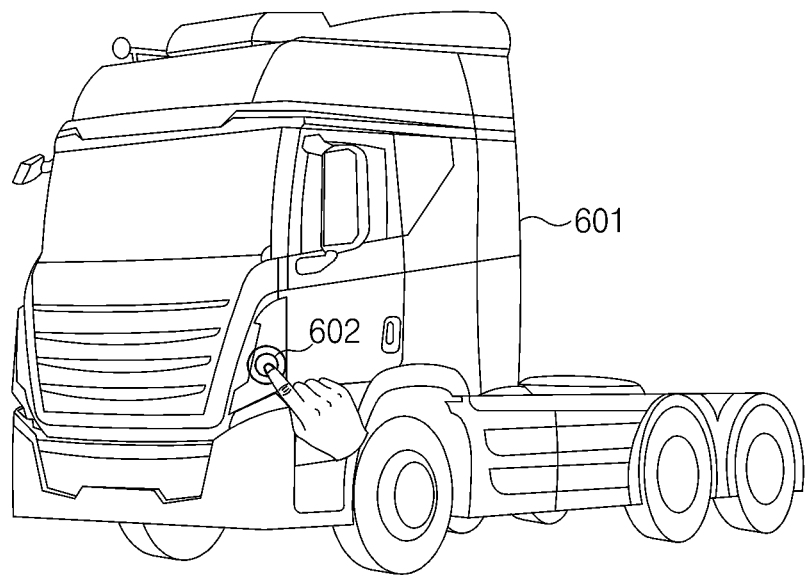
FIG. 6 is a drawing illustrating that an external button of an autonomous vehicle is pressed according to various exemplary embodiments of the present invention.

FIG. 6 is a drawing illustrating that an external button of an autonomous vehicle is pressed according to various exemplary embodiments of the present invention.

Referring to FIG. 6, an autonomous vehicle 601 of FIG. 2 may have an external button 602 on the outside of the autonomous vehicle 601.

As an example, the external button 602 may be provided at a height where it is easy for a user to press the external button 602 at an external side of the door of the autonomous vehicle 601 or next to the door of the autonomous vehicle 601.

A logistics person may park or stop the autonomous vehicle 601 in a position determined that it is easy to load and unload cargoes to load and unload the cargoes from the autonomous vehicle 601.

To proceed with authentication for performing remote control of the autonomous vehicle 601, the logistics person may press the external button 602 provided in the autonomous vehicle 601.

The logistics person may press the external button 602 and may authenticate a remote control terminal in various methods to access a remote autonomous driving control management apparatus.

As an example, when the external button 602 is pressed, the autonomous vehicle 601 may provide a voice call with a manager through an external speaker of the autonomous vehicle 601, a keypad provided on the outside of the autonomous vehicle 210, which receives a number of the remote control terminal, a connection with the manager through a vehicle interior system, which is provided after the door of the autonomous vehicle 601 is opened, or a QR code displayed on the autonomous vehicle 601.

The logistics person may authenticate the remote control terminal based on a voice call with the manager through the external speaker of the autonomous vehicle 601, a number of the remote control terminal, which is input to the keypad of the autonomous vehicle 601, a connection with the manager through the vehicle interior system, which is provided after the door of the autonomous vehicle 601 is opened, or a QR code displayed on the autonomous vehicle 601.

Figure 7:
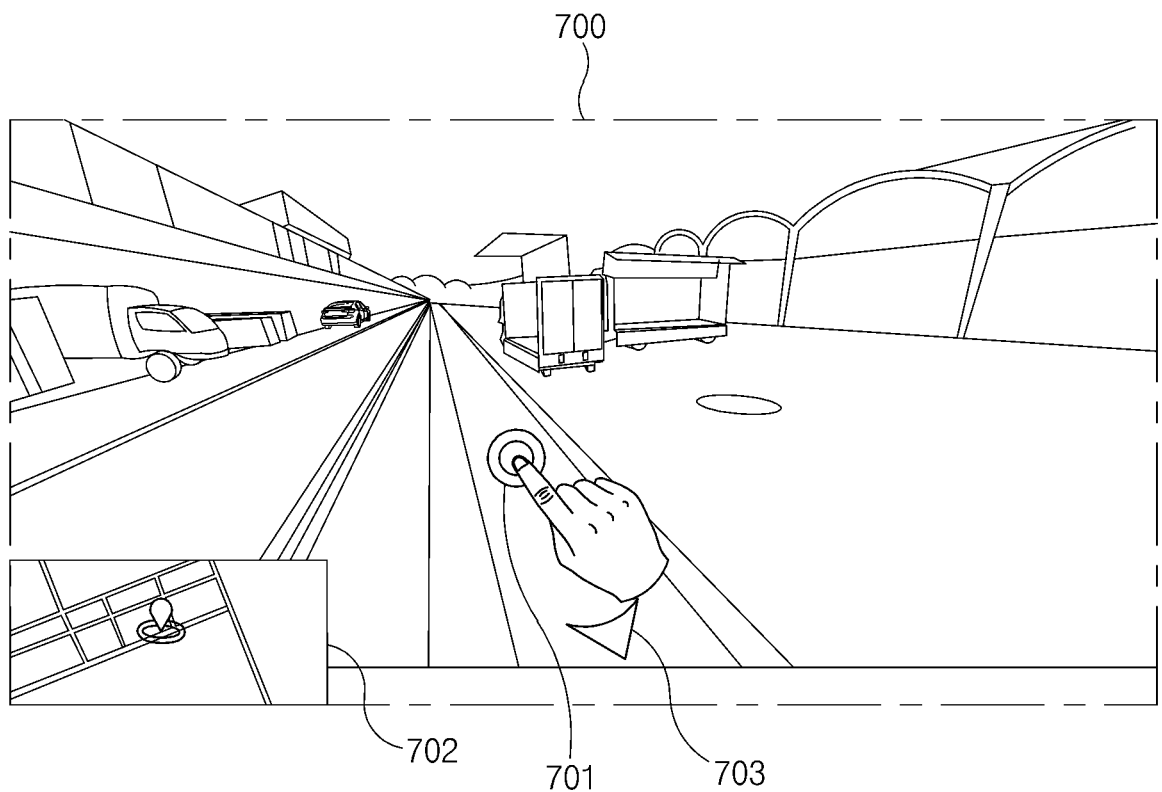
FIG. 7 is a drawing illustrating that a remote control terminal displays a surrounding image around an autonomous vehicle according to various exemplary embodiments of the present invention.

FIG. 7 is a drawing illustrating that a remote control terminal displays a surrounding image around an autonomous vehicle according to various exemplary embodiments of the present invention.

Referring to FIG. 7, a surrounding image 700 around the autonomous vehicle may be displayed on a display of the remote control terminal.

The remote control terminal may display a surrounding image around the autonomous vehicle at various angles on the display, by a drag input or the like according to a touch 701 of a logistics person on a 360-degree image around the autonomous vehicle, which is obtained by a camera provided in the autonomous vehicle.

Furthermore, the remote control terminal may provide a function of zooming in/out on the surrounding image 700 around the autonomous vehicle depending on the touch input 701.

Furthermore, the remote control terminal may provide a mini-map 702 on the display and may display a view at a point, depending on a touch of the point on the mini-map 702.

The remote control terminal may output an arrow figure 703 along a road direction on a surrounding image around the autonomous vehicle, which is displayed on the display. When a user touches the arrow figure 703, the remote control terminal may display a view moved in the direction on the display.

Furthermore, the remote control terminal may provide various functions for displaying a surrounding image around the autonomous vehicle on the screen.

Figure 8:
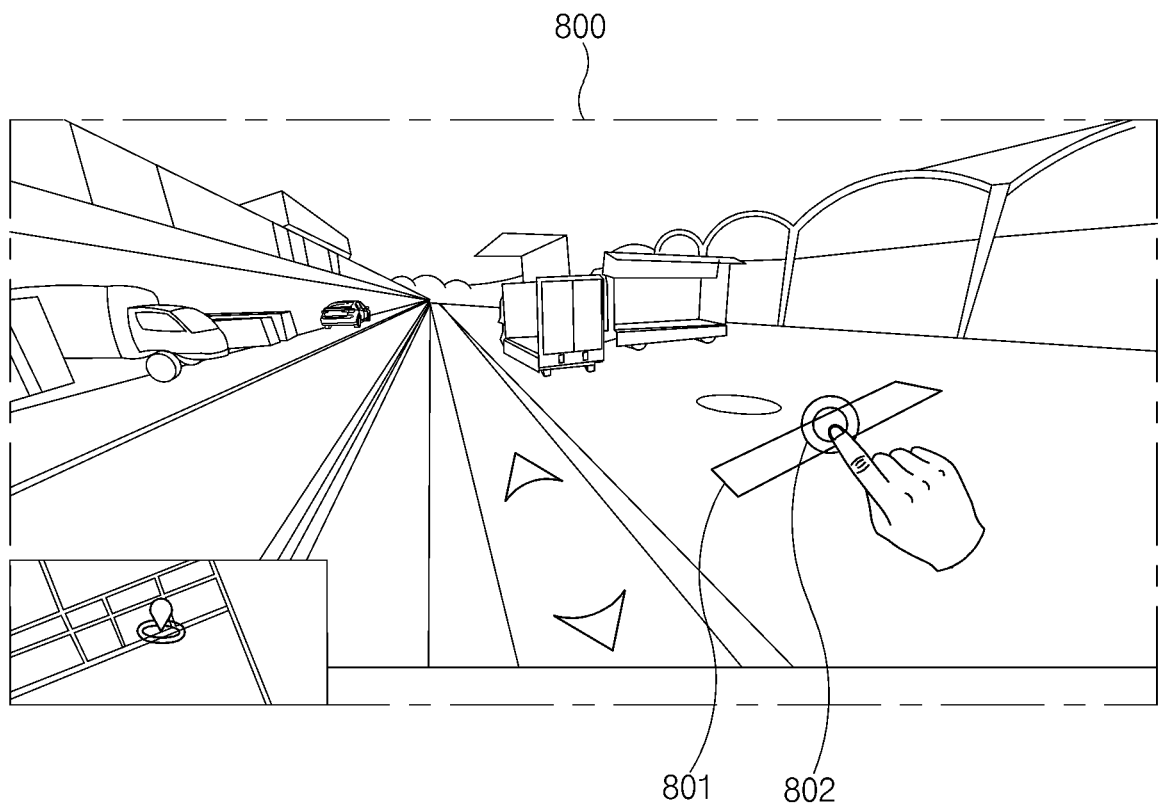
FIG. 8 is a drawing illustrating that a remote control terminal displays an available parking region according to various exemplary embodiments of the present invention.

FIG. 8 is a drawing illustrating that a remote control terminal displays an available parking region according to various exemplary embodiments of the present invention.

Referring to FIG. 8, the remote control terminal may display a surrounding image 800 around an autonomous vehicle on its display.

The remote control terminal may display an available parking region 801, determined based on a size of the autonomous vehicle, on the surrounding image 800 around the autonomous vehicle.

As an example, the remote control terminal may display the available parking region 801 using a predetermined specific color.

As an example, the remote control terminal may receive a parking position requested for parking or stop of the autonomous vehicle in the available parking region 801 by a touch 802 of a touch screen from a logistics person.

As an example, the remote control terminal may output the surrounding image 800 around the autonomous vehicle according to real-time motion of the autonomous vehicle on the display.

At the present time, the remote control terminal may receive an adjusted parking position from the logistics person by the touch 802 of the touch screen.

As an example, the remote control terminal may transmit information related to the received parking position or the adjusted parking position to the remote autonomous driving control management apparatus.

Figure 9:
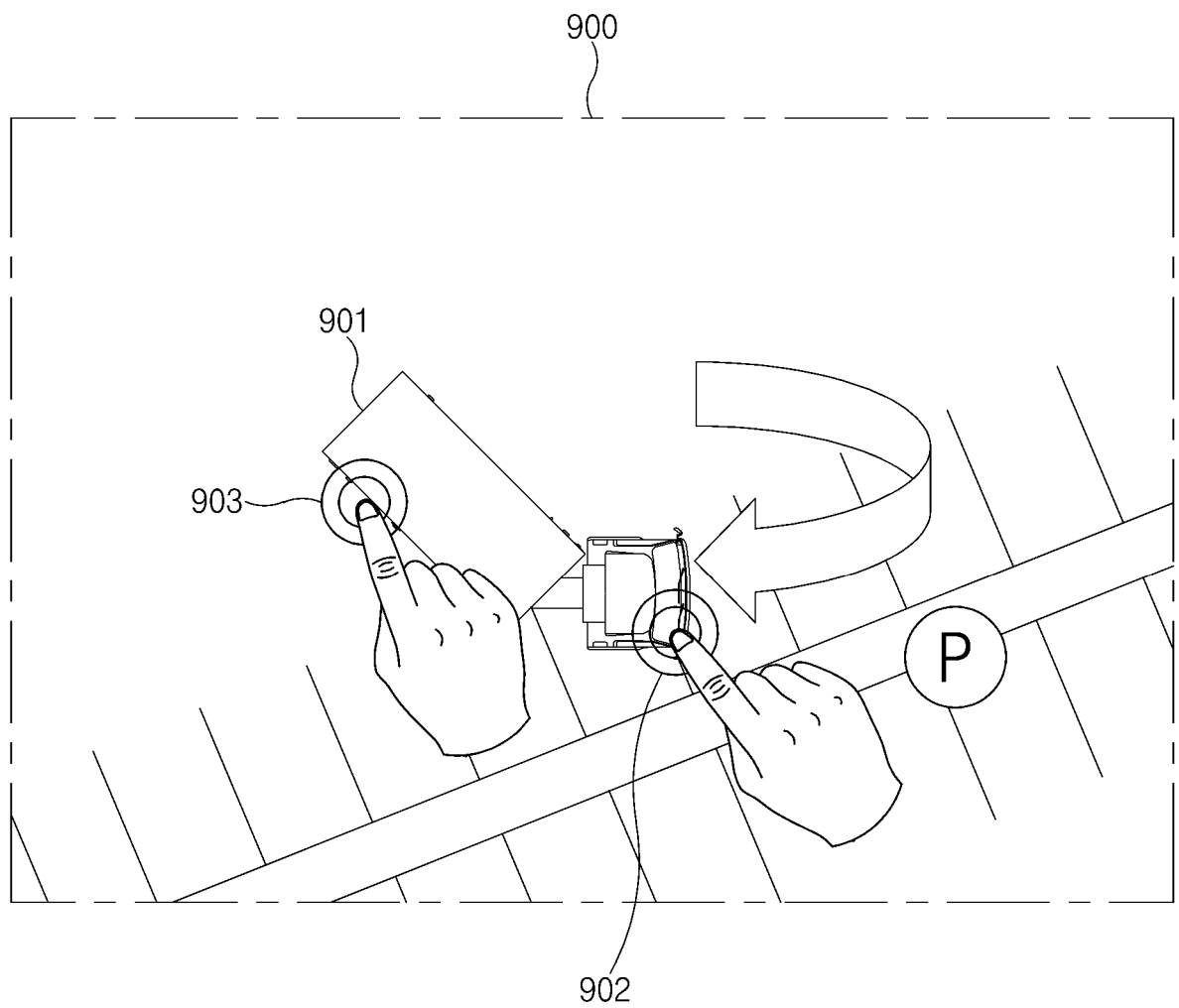
FIG. 9 is a drawing illustrating that a remote control terminal receives information related to front parking or rear parking according to various exemplary embodiments of the present invention.

FIG. 9 is a drawing illustrating that a remote control terminal receives information related to front parking or rear parking according to various exemplary embodiments of the present invention.

Referring to FIG. 9, the remote control terminal may display a map 900 around an autonomous vehicle on its display.

The remote control terminal may output an autonomous vehicle 901 on the display.

The remote control terminal may receive touches 902 and 903 of two points on a touch screen from a logistics person.

The remote control terminal may receive a horizontal rotation of the autonomous vehicle 901 based on the received touches 902 and 903 of the two points.

As an example, when at least one of the touch 902 on a front surface of the autonomous vehicle 901 or the touch 903 on a rear surface of the autonomous vehicle 901 moves while dragged, the remote control terminal may generate a signal for performing remote control such that a front portion or a rear portion of the autonomous vehicle 901 moves in the dragged direction to park or stop and may transmit the generated signal to a remote autonomous driving control management apparatus.

The remote control terminal may receive information related to a parking direction of the autonomous vehicle 901 in various methods other than the method provided in FIG. 9 and may transmit the received information related to the parking direction to the remote autonomous driving control management apparatus.

Figure 10:
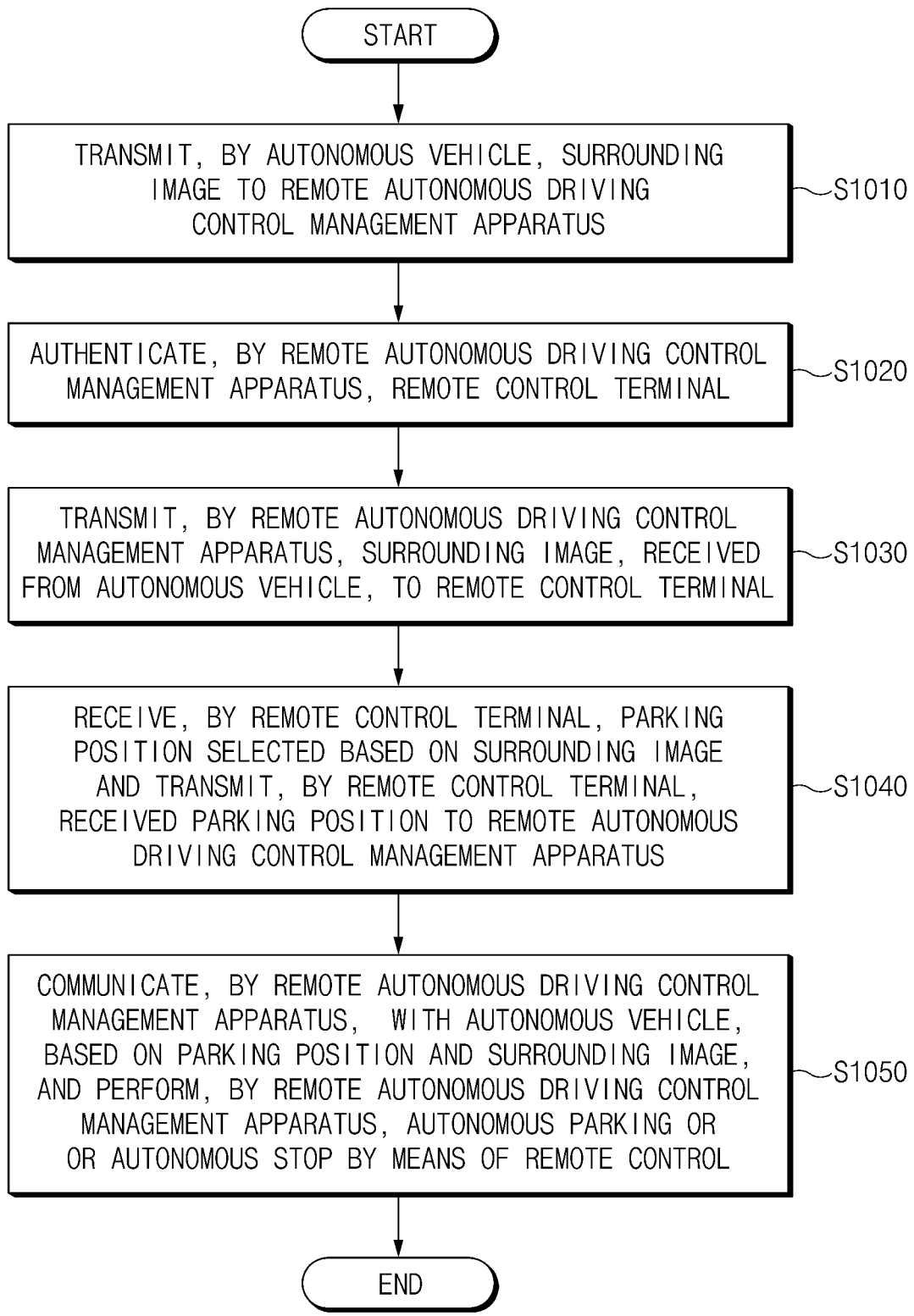
FIG. 10 is a flowchart illustrating a remote autonomous driving control management method according to various exemplary embodiments of the present invention.

FIG. 10 is a flowchart illustrating a remote autonomous driving control management method according to various exemplary embodiments of the present invention.

Referring to FIG. 10, the remote autonomous driving control management method may include transmitting (S1010), by an autonomous vehicle, a surrounding image to a remote autonomous driving control management apparatus, authenticating (S1020), by the remote autonomous driving control management apparatus, a remote control terminal, transmitting (S1030), by the remote autonomous driving control management apparatus, the surrounding image received from the autonomous vehicle, to a remote control terminal, receiving (S1040), by the remote control terminal, a parking position selected based on the surrounding image and transmitting, by the remote control terminal, the received parking position to the remote autonomous driving control management apparatus, and communicating (S1050), by the remote autonomous driving control management apparatus, with the autonomous vehicle based on the parking position and the surrounding image and performing, by the remote autonomous driving control management apparatus, autonomous parking or autonomous stop of the autonomous vehicle by remote control thereof.

As an example, the authenticating (S1020) of the remote control terminal by the remote autonomous driving control management apparatus may include transmitting, by the remote autonomous driving control management apparatus, a remote control link to the remote control terminal when a time remaining until the autonomous vehicle arrives at a destination thereof is a specific time, when approval for the remote control terminal is completed in advance.

As an example, the remote autonomous driving control management method may further include providing, by the autonomous vehicle, an authentication means provided in the autonomous vehicle, when an input through an input device of the autonomous vehicle is received until a predetermined threshold time after the autonomous vehicle arrives at the destination.

As an example, the authenticating (S1020) of the remote control terminal by the remote autonomous driving control management apparatus may further include authenticating, by the remote autonomous driving control management apparatus, the remote control terminal based on the authentication means provided in the autonomous vehicle, when the input through the input device of the autonomous vehicle is received until the predetermined threshold time after the autonomous vehicle arrives at the destination.

As an example, the receiving (S1040) of the parking position selected based on the surrounding image and the transmitting of the received parking position to the remote autonomous driving control management apparatus by the remote control terminal may include displaying, by the remote control terminal, an available parking region on the surrounding image based on a size of the autonomous vehicle, receiving, by the remote control terminal, a selection of the parking position based on the available parking region, and transmitting, by the remote control terminal, information related to the selected parking position to the remote autonomous driving control management apparatus.

As an example, the remote autonomous driving control management method may further include receiving, by the remote control terminal, at least one of information related to front parking or rear parking selected based on the surrounding image or information related to a selected trailer position and transmitting, by the remote control terminal, the at least one of the information related to the front parking or the rear parking selected based on the surrounding image or the information related to the selected trailer position to the remote autonomous driving control management apparatus. The communicating (S1050) with the autonomous vehicle and the performing of the autonomous parking or the autonomous stop by the remote control by the remote autonomous driving control management apparatus may include performing, by the remote autonomous driving control management apparatus, the autonomous parking or the autonomous stop by the remote control based on the at least one of the information related to the front parking or the rear parking selected based on the surrounding image or the information related to the selected trailer position.

As an example, the remote autonomous driving control management method may further include displaying, by the remote control terminal, a real-time motion of the autonomous vehicle, receiving, by the remote control terminal, an adjusted parking position, and transmitting, by the remote control terminal, information related to the adjusted parking position to the remote autonomous driving control management apparatus. The communicating (S1050) with the autonomous vehicle and the performing of the autonomous parking or the autonomous stop by the remote control by the remote autonomous driving control management apparatus may include performing, by the remote autonomous driving control management apparatus, the autonomous parking or the autonomous stop based on the adjusted parking position.

The operations of the method or the algorithm described in connection with the exemplary embodiments included herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be provided of effects of the remote autonomous driving control management apparatus, the system having the same, and the method thereof according to exemplary embodiments of the present invention.

According to at least one of embodiments of the present invention, the remote autonomous driving control management apparatus, the system including the same, and the method thereof may be provided to consider loading and unloading or riding and alighting.

Furthermore, according to at least one of embodiments of the present invention, the remote autonomous driving control management apparatus, the system including the same, and the method thereof are provided to share an accurate position through communication to facilitate precise remote control.

Furthermore, according to at least one of embodiments of the present invention, the remote autonomous driving control management apparatus, the system including the same, and the method thereof are provided to perform remote control to facilitate rapid response to changes in logistics environment.

Furthermore, according to at least one of embodiments of the present invention, the remote autonomous driving control management apparatus, the system including the same, and the method thereof are provided to increase convenience of the user who loads or unloads cargoes or rides or alights from the vehicle, with regard to loading and unloading or riding and alighting.

Furthermore, according to at least one of embodiments of the present invention, the remote autonomous driving control management apparatus, the system including the same, and the method thereof are provided to provide various methods where a logistics person is able to be connected with a remote person such that the logistics person is able to improve business efficiency of the remote person depending on activation of communication.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A remote autonomous driving control management apparatus, comprising:
a communication device configured to communicate with an autonomous vehicle and a remote control terminal; and
a controller configured to:
authenticate the remote control terminal;
transmit a surrounding image around the autonomous vehicle, the surrounding image being received from the autonomous vehicle, to the remote control terminal, via the communication device;
receive a parking position selected according to the surrounding image from the remote control terminal, via the communication device;
communicate with the autonomous vehicle via the communication device, based on the parking position and the surrounding image; and
perform autonomous parking or autonomous stop of the autonomous vehicle by remote control thereof,
wherein the remote autonomous driving control management apparatus is included in a server,
wherein the autonomous vehicle is configured to provide an authentication means provided in the autonomous vehicle, when an input to proceed with authentication for performing remote control of the autonomous vehicle through an input device of the autonomous vehicle is received until a predetermined threshold time after the autonomous vehicle arrives at a destination thereof, and
wherein the autonomous vehicle is configured to provide the authentication means by a display, a keypad or a touch screen of the autonomous vehicle,
wherein the remote control terminal is configured to:
receive touch through a touch screen of the remote control terminal, wherein the touch includes at least one of a touch on a front portion of the autonomous vehicle or a touch on a rear portion of the autonomous vehicle,
generate a signal for performing remote control that the autonomous vehicle moves to park or stop based on the received touch, and
transmit the generated signal to the remote autonomous driving control management apparatus.

2. The remote autonomous driving control management apparatus of claim 1, wherein the controller is configured to transmit a remote control link to the remote control terminal via the communication device, when a time remaining until the autonomous vehicle arrives at the destination thereof is a predetermined time period, and when approval for the remote control terminal is completed in advance.

3. The remote autonomous driving control management apparatus of claim 1, wherein the controller is configured to authenticate the remote control terminal based on the authentication means provided in the autonomous vehicle.

4. The remote autonomous driving control management apparatus of claim 1, wherein the controller is configured:
to display an available parking region on the surrounding image by the remote control terminal, based on a size of the autonomous vehicle; and
to receive a selection of the parking position based on the available parking region, via the remote control terminal.

5. The remote autonomous driving control management apparatus of claim 1, wherein the controller is configured to receive at least one of information related to front parking or rear parking selected according to the surrounding image or information related to a selected trailer position from the remote control terminal, via the communication device and to perform the autonomous parking or the autonomous stop by the remote control, based on the at least one of the information related to the selected front parking or rear parking or the information related to the selected trailer position.

6. The remote autonomous driving control management apparatus of claim 1, wherein the controller is configured to display real-time motion of the autonomous vehicle by the remote control terminal, to receive an adjusted parking position via the remote control terminal, and to perform the autonomous parking or the autonomous stop by the remote control, based on the adjusted parking position.

7. A remote autonomous driving control management system, comprising:
an autonomous vehicle configured to transmit a surrounding image to a remote autonomous driving control management apparatus;
the remote autonomous driving control management apparatus configured to:
authenticate a remote control terminal;
transmit the surrounding image received from the autonomous vehicle, to the remote control terminal;
communicate with the autonomous vehicle, based on a parking position input via the remote control terminal and the surrounding image; and
perform autonomous parking or autonomous stop of the autonomous vehicle by remote control thereof; and
the remote control terminal configured to receive the parking position selected according to the surrounding image and transmit the received parking position to the remote autonomous driving control management apparatus,
wherein the remote autonomous driving control management apparatus is included in a server,
wherein the autonomous vehicle is configured to provide an authentication means provided in the autonomous vehicle, when an input through an input device of the autonomous vehicle is received until a predetermined threshold time after the autonomous vehicle arrives at a destination thereof, and
wherein the autonomous vehicle is configured to provide the authentication means by a display, a keypad or a touch screen of the autonomous vehicle,
wherein the remote control terminal is configured to:
receive touch through a touch screen of the remote control terminal, wherein the touch includes at least one of a touch on a front portion of the autonomous vehicle or a touch on a rear portion of the autonomous vehicle,
generate a signal for performing remote control that the autonomous vehicle moves to park or stop based on the received touch, and
transmit the generated signal to the remote autonomous driving control management apparatus.

8. The remote autonomous driving control management system of claim 7, wherein the remote autonomous driving control management apparatus is configured to transmit a remote control link to the remote control terminal, when a time remaining until the autonomous vehicle arrives at the destination thereof is a predetermined time period, when approval for the remote control terminal is completed in advance.

9. The remote autonomous driving control management system of claim 7, wherein the remote autonomous driving control management apparatus is configured to authenticate the remote control terminal based on the authentication means provided in the autonomous vehicle, when the input through the input device of the autonomous vehicle is received until the predetermined threshold time after the autonomous vehicle arrives at the destination.

10. The remote autonomous driving control management system of claim 7, wherein the remote control terminal is configured to display an available parking region on the surrounding image based on a size of the autonomous vehicle, receive a selection of the parking position based on the available parking region, and transmit information related to the selected parking position to the remote autonomous driving control management apparatus.

11. The remote autonomous driving control management system of claim 7,
wherein the remote control terminal is configured to receive at least one of information related to front parking or rear parking selected according to the surrounding image or information related to a selected trailer position and to transmit the at least one of the information related to the front parking or the rear parking selected according to the surrounding image or the information related to the selected trailer position to the remote autonomous driving control management apparatus, and
wherein the remote autonomous driving control management apparatus is configured to perform the autonomous parking or the autonomous stop by the remote control, based on the at least one of the information related to the front parking or the rear parking selected according to the surrounding image or the information related to the selected trailer position.

12. The remote autonomous driving control management system of claim 7,
wherein the remote control terminal is configured to display a real-time motion of the autonomous vehicle, to receive an adjusted parking position, and to transmit information related to the adjusted parking position to the remote autonomous driving control management apparatus, and
wherein the remote autonomous driving control management apparatus is configured to perform the autonomous parking or the autonomous stop by the remote control, based on the adjusted parking position.

13. A remote autonomous driving control management method, comprising:
transmitting, by an autonomous vehicle, a surrounding image to a remote autonomous driving control management apparatus;
authenticating, by the remote autonomous driving control management apparatus, a remote control terminal;
transmitting, by the remote autonomous driving control management apparatus, the surrounding image received from the autonomous vehicle, to the remote control terminal;
receiving, by the remote control terminal, a parking position selected according to the surrounding image and transmitting, by the remote control terminal, the received parking position to the remote autonomous driving control management apparatus; and
communicating, by the remote autonomous driving control management apparatus, with the autonomous vehicle, based on the parking position and the surrounding image, and performing, by the remote autonomous driving control management apparatus, autonomous parking or autonomous stop of the autonomous vehicle by remote control thereof,
wherein the remote autonomous driving control management apparatus is included in a server,
wherein the autonomous vehicle is configured to provide an authentication means provided in the autonomous vehicle, when an input to proceed with authentication for performing remote control of the autonomous vehicle through an input device of the autonomous vehicle is received until a predetermined threshold time after the autonomous vehicle arrives at a destination thereof, and
wherein the autonomous vehicle is configured to provide the authentication means by a display, a keypad or a touch screen of the autonomous vehicle,
wherein the remote control terminal is configured to:
receive touch through a touch screen of the remote control terminal, wherein the touch includes at least one of a touch on a front portion of the autonomous vehicle or a touch on a rear portion of the autonomous vehicle,
generate a signal for performing remote control that the autonomous vehicle moves to park or stop based on the received touch, and
transmit the generated signal to the remote autonomous driving control management apparatus.

14. The remote autonomous driving control management method of claim 13,
wherein the authenticating of the remote control terminal by the remote autonomous driving control management apparatus includes:
transmitting, by the remote autonomous driving control management apparatus, a remote control link to the remote control terminal, when a time remaining until the autonomous vehicle arrives at the destination thereof is a predetermined time period, when approval for the remote control terminal is completed in advance.

15. The remote autonomous driving control management method of claim 13,
wherein the authenticating of the remote control terminal by the remote autonomous driving control management apparatus further includes:
authenticating, by the remote autonomous driving control management apparatus, the remote control terminal based on the authentication means provided in the autonomous vehicle, when the input through the input device of the autonomous vehicle is received until the predetermined threshold time after the autonomous vehicle arrives at the destination.

16. The remote autonomous driving control management method of claim 13,
wherein the receiving of the parking position selected according to the surrounding image by the remote control terminal and the transmitting of the received parking position to the remote autonomous driving control management apparatus by the remote control terminal includes:
displaying, by the remote control terminal, an available parking region on the surrounding image based on a size of the autonomous vehicle;
receiving, by the remote control terminal, a selection of the parking position based on the available parking region; and
transmitting, by the remote control terminal, information related to the selected parking position to the remote autonomous driving control management apparatus.

17. The remote autonomous driving control management method of claim 13, further including:
- receiving, by the remote control terminal, at least one of information related to front parking or rear parking selected according to the surrounding image or information related to a selected trailer position; and
- transmitting, by the remote control terminal, the at least one of the information related to the front parking or the rear parking selected according to the surrounding image or the information related to the selected trailer position to the remote autonomous driving control management apparatus,
- wherein the communicating with the autonomous vehicle and the performing of the autonomous parking or the autonomous stop by the remote control by the remote autonomous driving control management apparatus includes:
- performing, by the remote autonomous driving control management apparatus, the autonomous parking or the autonomous stop by the remote control, based on the at least one of the information related to the front parking or the rear parking selected according to the surrounding image or the information related to the selected trailer position.

18. The remote autonomous driving control management method of claim 13, further including:
- displaying, by the remote control terminal, a real-time motion of the autonomous vehicle;
- receiving, by the remote control terminal, an adjusted parking position; and
- transmitting, by the remote control terminal, information related to the adjusted parking position to the remote autonomous driving control management apparatus,
- wherein the communicating with the autonomous vehicle and the performing of the autonomous parking or the autonomous stop by the remote control by the remote autonomous driving control management apparatus includes:
- performing, by the remote autonomous driving control management apparatus, the autonomous parking or the autonomous stop by the remote control based on the adjusted parking position.

* * * * *